(12) United States Patent
Chen et al.

(10) Patent No.: US 7,019,886 B2
(45) Date of Patent: Mar. 28, 2006

(54) LIGHT MODULATOR

(75) Inventors: Chien-Hua Chen, Corvallis, OR (US); David M. Craig, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 57 days.

(21) Appl. No.: 10/855,744

(22) Filed: May 27, 2004

(65) Prior Publication Data

US 2005/0275925 A1    Dec. 15, 2005

(51) Int. Cl.
*G02B 26/00* (2006.01)

(52) U.S. Cl. ...................... 359/290; 359/291

(58) Field of Classification Search ................. 359/290
See application file for complete search history.

(56) References Cited

U.S. PATENT DOCUMENTS

| 6,409,198 | B1 | 6/2002 | Weimer et al. | 250/339.04 |
|---|---|---|---|---|
| 6,424,450 | B1 | 7/2002 | Goossen | 359/290 |
| 6,538,312 | B1 | 3/2003 | Peterson et al. | 257/680 |
| 6,650,455 | B1 | 11/2003 | Miles | 359/257 |
| 6,693,573 | B1 | 2/2004 | Linder | 341/143 |
| 6,741,384 | B1 | 5/2004 | Martin et al. | 359/291 |
| 6,872,984 | B1 * | 3/2005 | Leung | 257/81 |
| 2005/0134792 | A1 * | 6/2005 | Deary et al. | 349/187 |

FOREIGN PATENT DOCUMENTS

JP    2001-176655    *   6/2001

* cited by examiner

*Primary Examiner*—Scott J. Sugarman
*Assistant Examiner*—Richard Hanig (57) ABSTRACT

A method for forming a light modulator includes supporting a plurality of optical devices on a substrate, and attaching a sheet of glass over the optical devices. The method also includes slicing the sheet of glass into a plurality of pieces of glass.

36 Claims, 7 Drawing Sheets

LIGHT MODULATOR

BACKGROUND OF THE INVENTION

A microelectromechanical system (MEMS) is a microdevice that integrates mechanical and electrical elements on a common substrate using microfabrication technology. The electrical elements are formed using known integrated circuit fabrication techniques, while the mechanical elements are fabricated using lithographic techniques that selectively micromachine portions of a substrate. Additional layers are often added to the substrate and then micromachined until the MEMS device is in a desired configuration. MEMS devices include actuators, sensors, switches, accelerometers, modulators, and optical devices.

In the past, the telecom industry used MEMS devices for large-area 3-D switches. Present technology now permits single-chip projectors and other optical devices. As MEMS devices continue to get smaller and cheaper, the tiny devices are poised to replace LCDs, make digital projection cheaper and more portable, and offer new types of optical biopsies in medicine.

Single chip light modulators and other devices are generally packaged with a glass lid. The glass lid is placed into the frame. Many times the glass reflects some of the light from the light modulator back toward the screen to reduce the contrast between light and dark at the chip level.

The description set out herein illustrates the various embodiments of the invention, and such description is not intended to be construed as limiting in any manner.

DETAILED DESCRIPTION

In the following detailed description, reference is made to the accompanying drawings that form a part hereof, and in which are shown by way of illustration specific embodiments. The embodiments illustrated are described in sufficient detail to enable those skilled in the art to practice the teachings disclosed herein. Other embodiments can be utilized and derived therefrom, such that structural and logical substitutions and changes can be made without departing from the scope of present inventions. The following detailed description, therefore, is not to be taken in a limiting sense, and the scope of various embodiments of the invention is defined only by the appended claims, along with the full range of equivalents to which such claims are entitled.

Figure 1:
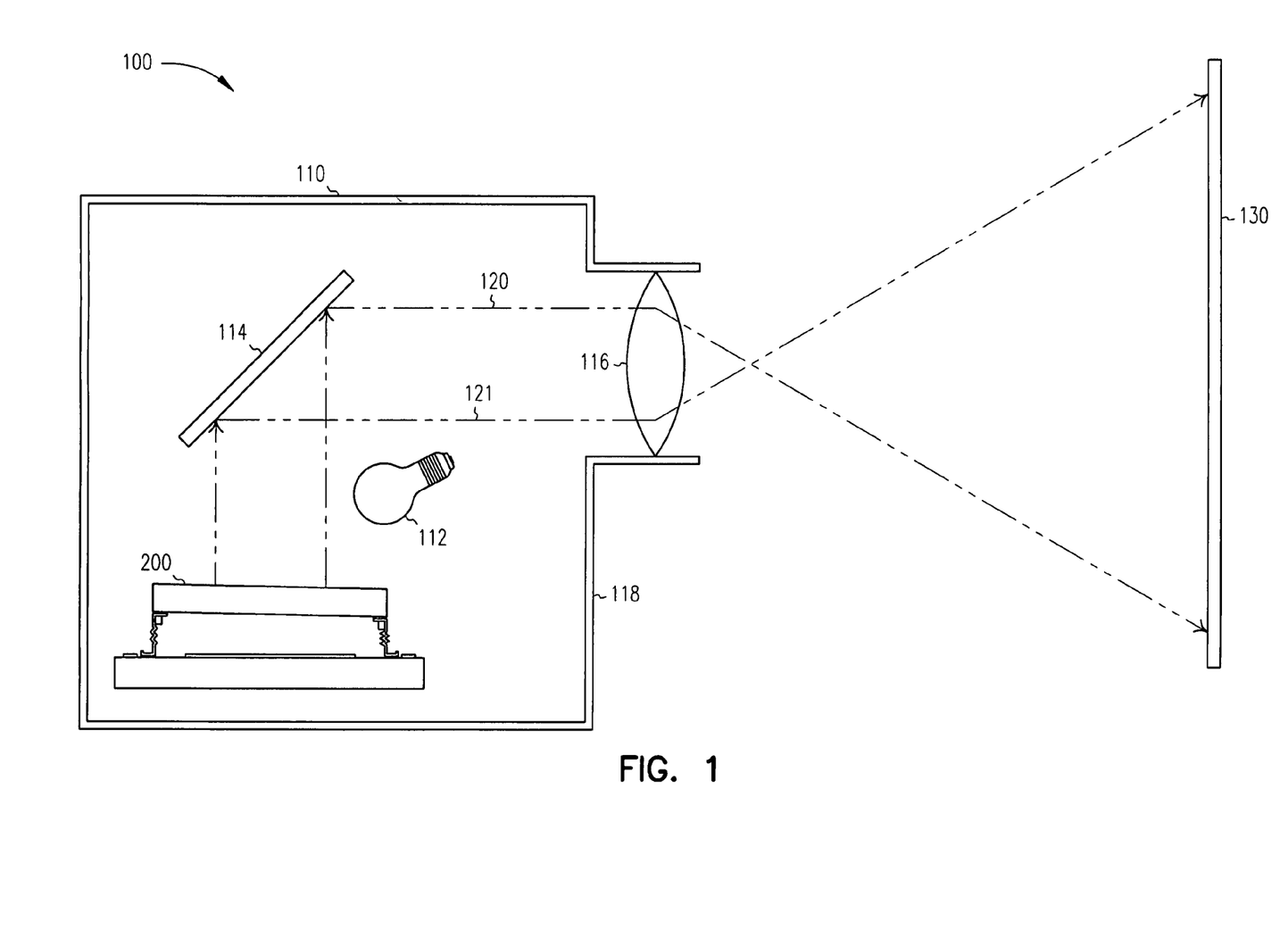
FIG. 1 illustrates a schematic view of a projection television system that uses at least one optical projection element, according to an embodiment of this invention.

FIG. 1 illustrates a schematic view of a projection television system 100 that uses at least one light modulator 200, according to an embodiment of this invention. The television projection assembly 100 includes a projector 110 and a screen 130. The projector 110 includes a light modulator 200, a lamp or source of light 112, a mirror 114 and optics 116. The light source or lamp 112, the light modulator 200, the mirror 114 and the optics 116 are within a housing 118. Light from the light source or lamp 112 is transmitted to the light modulator 200. The light modulator 200 is used to produce an image which is reflected by the mirror 114. The mirror 114 reflects light, such as rays 120 and 121 from the mirror 114 through the optics 116 and onto the screen 130. As shown in FIG. 1, the projection television system 100 is a reflective projector. In other words, light reflects from the image-forming element or the light modulator 200. In an additional embodiment, a transmissive projector includes light from the light source or lamp 112 transmitted through an image-forming element or light modulator 200.

Figure 2:
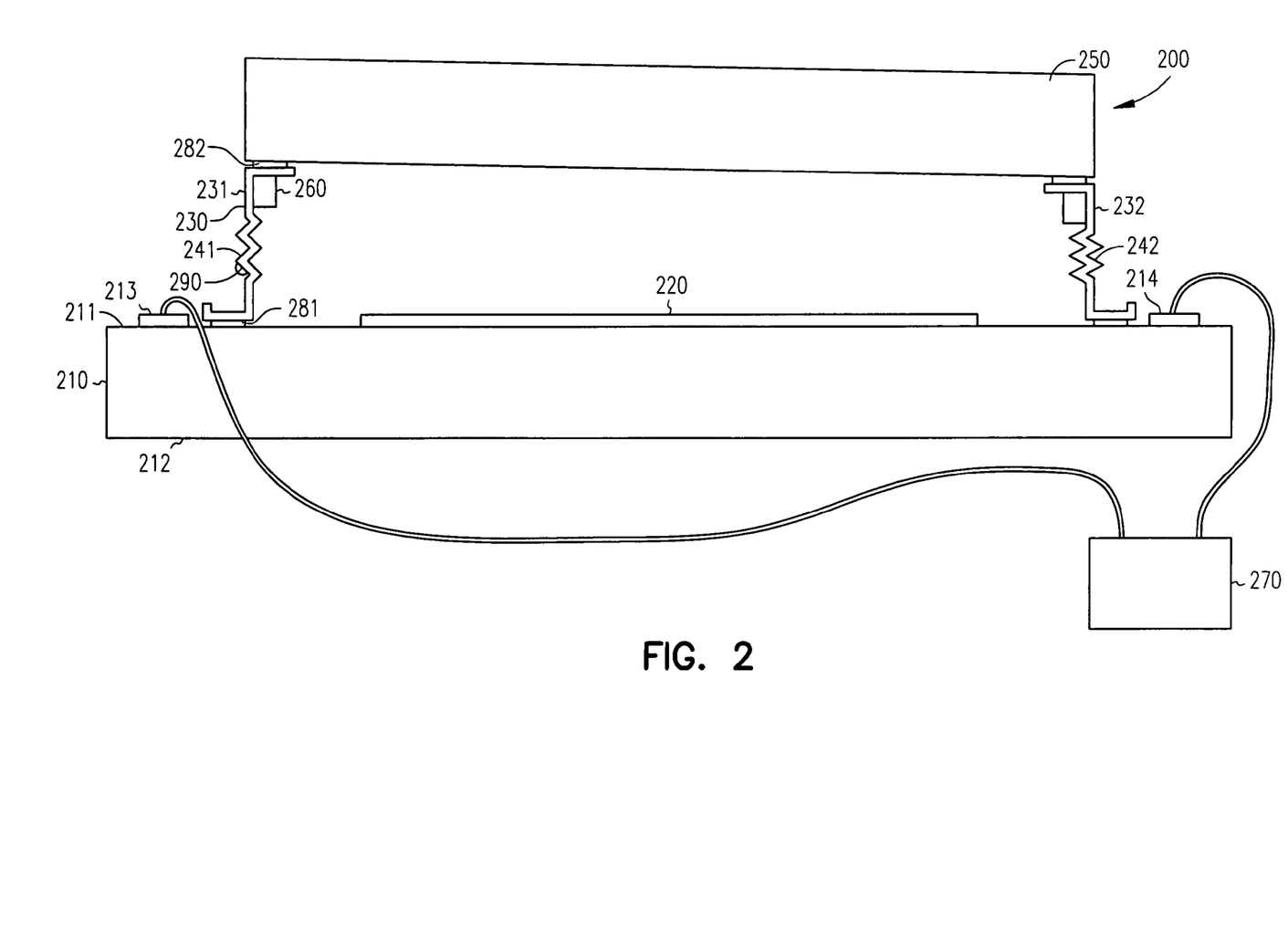
FIG. 2 illustrates a schematic side view of a light modulator, according to an embodiment of this invention.

FIG. 2 illustrates a schematic side view of a light modulator 200, according to an embodiment of this invention. The light modulator 200, also referred to as a package includes a substrate 210 having a first major surface 211, and a second major surface 212. An optical device 220 is supported on or attached to the substrate 210. A casing 230 is also fabricated on the substrate 210. The casing 230 surrounds the optical device 220. The casing 230 also includes sidewalls 231, 232 with stress relief structures 241, 242 therein. Although two sidewalls are shown, the light modulator 200 has a number of sidewalls that substantially surround the optical device 220. In some embodiments, there are four sidewalls. A glass lid 250 is attached to the casing 230. The glass lid 250, casing 230 and substrate 210 substantially seal the optical device 220. In some embodiments, the package, or light modulator 200, also includes a desiccant 260 positioned within the volume sealed by the casing 230, glass lid 250 and the substrate 210. The desiccant 260 can be any shape. In one embodiment, the desiccant is in the form of strips of material. In some embodiments, the optical device 220 supported on the substrate 210 is a MEMS device. The optical device 220 supported on the substrate 210, in some embodiments, is a light modulating device. The glass lid 250 is tilted with respect to the substrate 210.

The stress relief structures 241, 242 can either be elongated or shortened in order to adjust an amount of tilt of the glass lid 250 with respect to the substrate 210. An amount of tilt or non-parallelism between the glass lid 250 and the substrate 210 is selected so that light reflected by the glass lid is not onto the screen 130. When light from the light source or lamp 112 is directed at substantially 90 degrees with respect to the optical device 220, the reflected light lessens the amount of contrast between light and dark areas on the optical device 220. Therefore, by tilting the glass lid 250 with respect to the substrate 210, or more specifically with respect to the optical device 220, the contrast produced by the optical device 220 can be enhanced. The amount of tilt or angle between the glass lid 250 and the optical device 220 is selected so that the projected image is substantially unaffected.

The optical device 220 is supported on the substrate 210. The substrate 210 includes electrical conductors (not shown) which connect the optical device 220 to at least a first contact pad 213 and a second contact pad 214. In an embodiment, a plurality of contact pads will be positioned about the periphery of the optical device 220. The contact pad, such as contact pads 213, 214, will be positioned outside of the casing 230. The contact pads, such as contact pads 213, 214, will be used to input information to the optical device 220, as well as to receive outputs from the optical device 220. As shown in FIG. 2, the optical device 220 is controlled by a computing device 270. The computing device includes hardware and software to produce an image on the surface of the optical device 220.

The computing device 270 can include any number of computing devices including a microprocessor, a controller or a full computer, such as a personal computer or super computer. Image information is input to the computing device 270. The computing device 270 converts the image information into information used to control the optical device 220 to produce the image or series of images.

In some embodiments, the casing 230 includes Kovar which is available from Eagle Alloys Corp., 5610 Oleander Ave., Fort Pierce, Fla. of the United States of America. In other embodiments, the casing 230 includes 54Fe-29Ni-17Co. In still other embodiments, the casing 230 includes a metal material having a coefficient of thermal expansion substantially equal to the coefficient of thermal expansion of the substrate. In still other embodiments, the coefficient of thermal expansion is substantially equal to the coefficient of thermal expansion of silicon. The substrate 210, in some embodiments, is made of silicon. A casing with a coefficient of thermal expansion that is substantially equal to the coefficient of thermal expansion of the substrate limits relative motion between the sidewalls 231, 232 of the casing 230 and the substrate 210, due to a mismatch in coefficient in thermal expansion. Thus, the angle between the glass lid 250 and the MEMS or the optical device 220 will be substantially preserved. The stress-relief structures 241, 242 in the sidewalls 231, 232 relieve any stresses that might occur between the casing 230, the substrate 210, and the glass lid 250.

In some embodiments, the package or light modulator 200 also includes an adhesive 290 attached to the sidewalls 231, 232 of the casing 230. The adhesive 290 is used to set the position of the sidewalls 231, 232 of the casing 230 once the tilt or angle between the glass lid 250 and the substrate 210 or optical device 220 is found to be acceptable. In some embodiments, the adhesive is a UV-cured adhesive or UV-cured epoxy. During manufacture, the angle between the glass lid 250 and the optical device 220 is set. The adhesive 290 is then used to substantially set the tilt of the glass lid 250, with respect to the substrate 210 and the optical device 220 by exposing adhesive 290 to a UV light to cure or substantially cure the adhesive 290.

A first solder material 281 is used to attach the casing 230 to the substrate 210 and a second solder material 282 is used to attach the casing 230 to the glass lid 250. The first solder material 281 has a higher melting point than the second solder material 282. The first solder material 281, in some embodiments, is a gold germanium eutectic solder which is 12 wt % germanium in gold. Gold germanium eutectic solder has a melting point of 361° C. The gold germanium eutectic solder is used to attach the casing 230 to the substrate 210. The second solder material 282 is a gold tin eutectic solder which is 80 wt % of gold in tin. Gold tin eutectic solder has a melting point of 280° C. The glass lid 250 can be attached to the casing 230 using the gold tin solder which does not have to be heated to a point where the first solder for attaching the frame to the substrate will melt.

Figure 3:
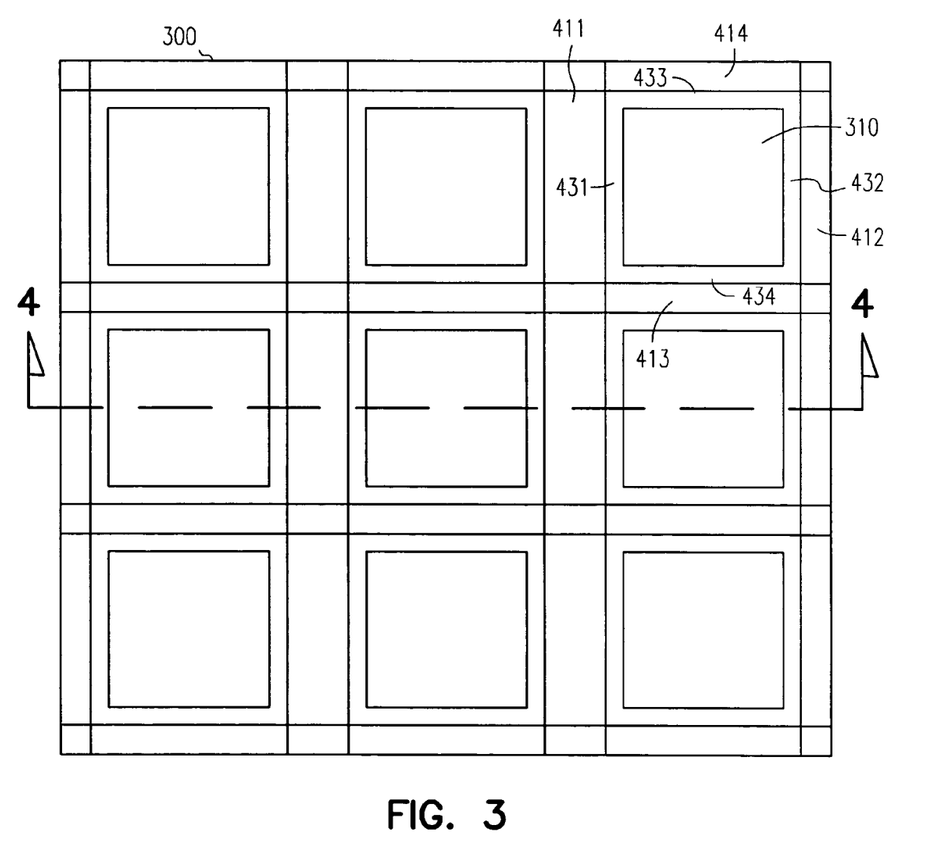
FIG. 3 illustrates a top view of a metal sheet that includes a plurality of apertures therein, according to an embodiment of this invention.
Figure 4:
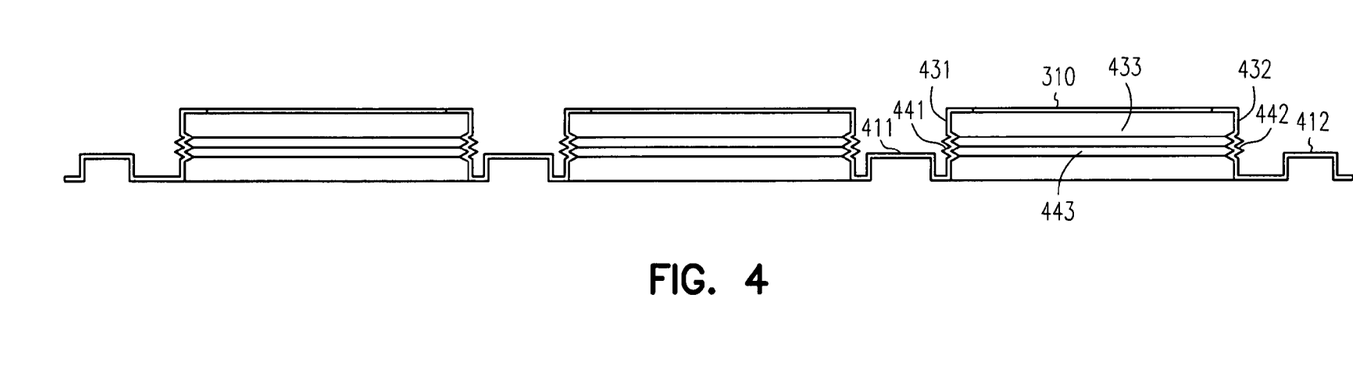
FIG. 4 illustrates a cross-sectional view of a metal sheet that includes a plurality of apertures therein, along line 4—4 of FIG. 3, according to an embodiment of this invention.

FIGS. 3 and 4 illustrate a metal sheet 300 that includes a plurality of apertures, such as aperture 310, therein, according to an embodiment of this invention. FIG. 3 is a top view of the metal sheet 300 while FIG. 4 illustrates a cross-sectional view of the metal sheet 300 along line 4—4 in FIG. 3. The metal sheet 300 is formed of a metal material by coining or stamping or by other processes. Initially, a flat metal sheet 300 is provided with apertures, such as aperture 310. The metal sheet is fabricated so that each aperture, such as aperture 310, include four sidewalls including a first sidewall 431, a second sidewall 432, and a third sidewall 433 and a fourth sidewall 434. The sidewalls 431, 432, 433 and 434 are also provided with saw-tooth-like stress relief structures, such as a stress relief structure 441, a stress relief structure 442, and a stress relief structure 443, shown in FIG. 4. Each aperture is surrounded by four sidewalls. For example, aperture 310 is surrounded by sidewalls 431, 432, 433, and 434. Each of the sidewalls also includes stress relief structure, in this particular embodiment.

Each of the apertures, such as aperture 310, and the sidewalls 431, 432, 433, 434 form a casing. Each casing is also surrounded by a bridge element. For example, the casing associated with aperture 310 includes a bridge element 411, a bridge element 412, a bridge element 413, and a bridge element 414. The bridge elements 411, 412, 413, 414 span a space around the periphery of each of the casings represented by an aperture, such as aperture 310. As shown in FIGS. 3 and 4, the metal sheet 300 includes nine apertures. It should be noted that in other embodiments, any number of apertures may be produced in a metal sheet 300. The metal sheet can also include other geometric shapes. The metal sheet 300, in one embodiment, is made of a material that has a coefficient of thermal expansion which is substantially equal to the coefficient of thermal expansion of silicon or another type of material.

Figure 5:
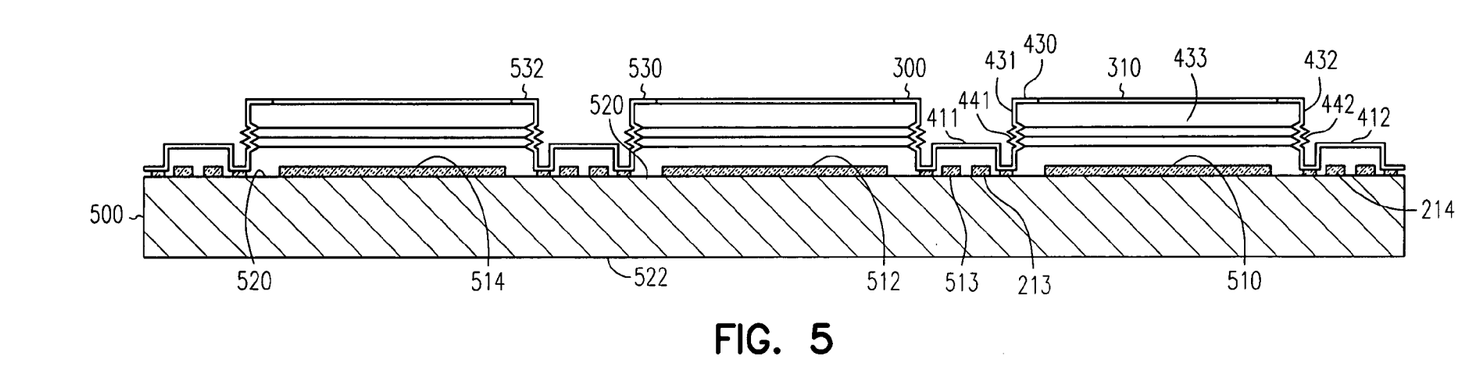
FIG. 5 illustrates a cross-sectional view of a metal sheet attached to a substrate that includes a plurality of optical devices, according to an embodiment of this invention.

FIGS. 5 to 9 show various steps in the process of making a plurality of light modulators 200 on a substrate 500, such as a wafer. Now, referring to the FIGS. 5 through 9, various steps or stages during manufacture of a plurality of light modulators will be discussed. FIG. 5 illustrates a cross-section view of a metal sheet 300 attached to a wafer 500 that includes a plurality of optical devices 510, 512, 514, according to an embodiment of the invention. The optical devices 510, 512, 514 are individual chips or die formed by semiconductor processing methods. In some embodiments, the chips or die 510, 512, 514 are MEMS (microelectromechanical system). The substrate includes a first major surface 520 and a second major surface 522. The optical devices 510, 512, 514 are supported on the first major surface. Also attached to the first major surface is a metal sheet 300 that includes a plurality of metal casings. As shown in FIG. 5, the metal sheet 300 includes casing 430, a casing 530 and a casing 532. Each of the casings 430, 530, 532 are substantially similar. Rather than describe each casing, one representative casing will be described in detail. The casing 430 includes sidewalls 431, 432, and 433. Each of the sidewalls includes a stress relief area 441, 442, 443. Positioned between each of the casings is a bridge, such as bridge 411 and bridge 412. The substrate 500 includes electrical contacts, such as electrical contact 214, electrical contact 213 and an electrical contact 513. Therefore, underneath the bridge element 411 are the electrical contact 513 and the electrical contact 213. Electrical contact 213 carries inputs or outputs to the optical device 510, while the electrical contact 513 carries inputs or outputs to the optical device 512. The bridge 411 spans or covers the electrical contacts 513, 213. The bridge 411 is spaced above and away from the electrical contacts 513, 213 so as to substantially prevent electrical shortening or inadvertent electrical contact between the two electrical contacts 513, 213.

Figure 6:
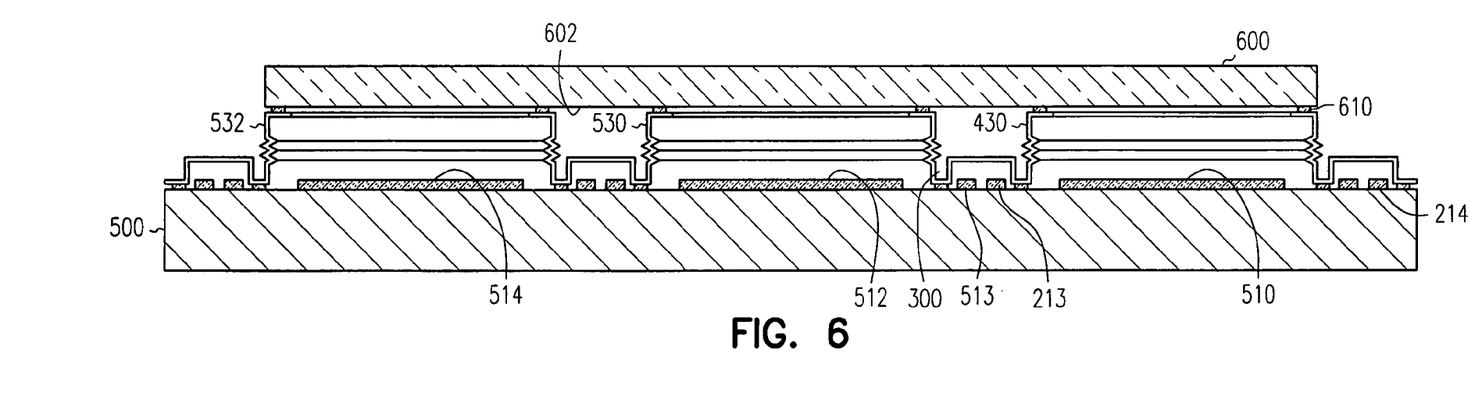
FIG. 6 illustrates a cross-sectional view of a glass sheet attached to a metal sheet, according to an embodiment of this invention.

FIG. 6 illustrates a cross-sectional view of a subsequent step during the manufacture of a plurality of light modulators according to an embodiment of this invention. In this particular cross-sectional view, a glass sheet 600 is attached to the upper portions of the casings 430, 530, 532. The plate of glass includes a thin chromium layer that is deposited on the side of the glass adjacent the casings 430, 530, 532. The chromium layer 610 has deposited substantially the entire surface of the glass 602 adjacent the casings 430, 530, 532 thereon. The chromium layer 610 is etched to provide apertures which correspond to the apertures in the metal sheet 300. A relatively low melting point solder can then be attached to the portion of the chromium layer 610 remaining on the sheet of glass 600.

The assembly shown in FIG. 6 can then be placed into an oven or other heat source and brought up to the temperature where the relatively low melting point solder melts, thereby bonding the glass sheet 600 to the casings 430, 530, 532. In one embodiment, the relatively low melting point solder is a gold tin eutectic solder having 80 wt % of gold in tin. Gold tin eutectic solder has a melting point of approximately 280° C. A higher melting point solder, such a gold germanium eutectic solder, is used to attach the metal sheet, including a plurality of casings 430, 530, 532 to the substrate or wafer 500. The gold germanium eutectic solder becomes liquid at approximately 361° C. As a result, the higher melting point the gold germanium eutectic solder does not enter a liquid phase as the assembly shown in FIG. 6 while the glass sheet 600 bonds to the casings 430, 530, 532. Thus, the substrate and the plurality of casings 430, 530, 532 do not become disconnected during the heating process for connecting the glass plate 600 to the various casings 430, 530, 532.

Figure 7:
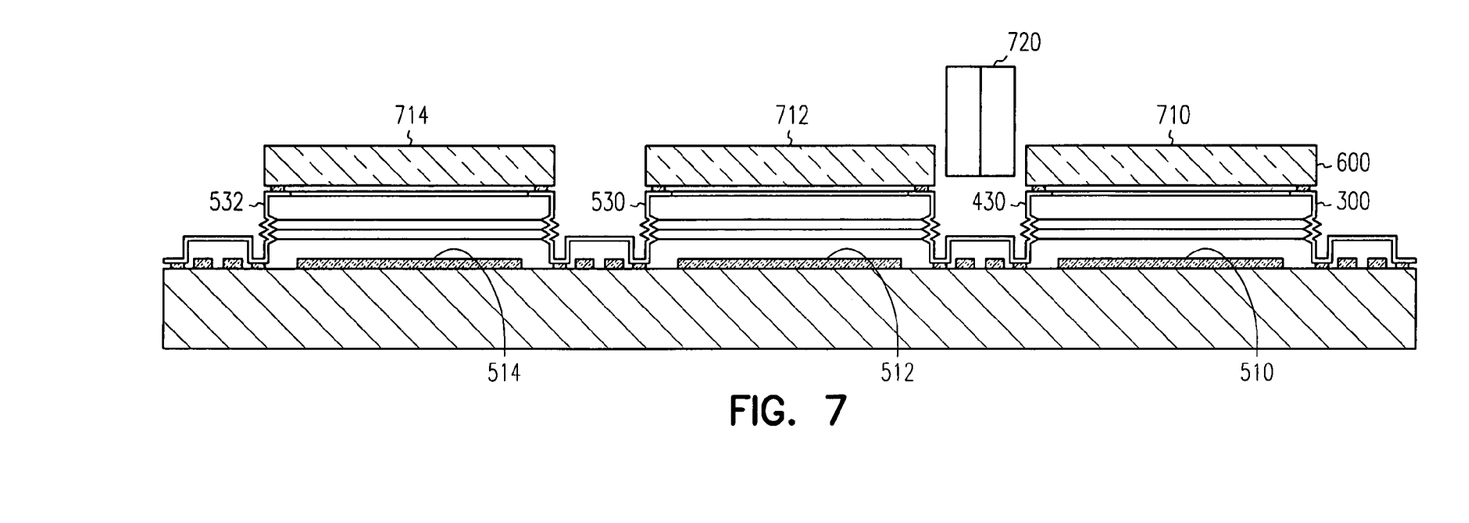
FIG. 7 illustrates a cross-sectional view of a glass sheet attached to a metal sheet wherein a saw cuts the glass sheet into individual glass lids, according to an embodiment of this invention.

FIG. 7 illustrates a cross-section view of a glass sheet 600 attached to a metal sheet 300 while a saw 720 is used to cut the glass sheet 600 into individual glass lids 710, 712, 714, according to an embodiment of this invention. Glass lid 710 is associated with the optical device 510, glass lid 712 is associated with the optical device 512, and glass lid 714 is associated with optical device 514. A saw 720 is positioned to slice or cut the glass sheet 600 into individual glass lids 710, 712, 714. In an embodiment, the saw 720 or a plurality of saws, is positioned to make cuts all the way around each of the casings 430, 530, 532. Therefore, in addition to the cuts shown in FIG. 7, cuts will also have to be made along the other edges of the casings 430, 530, 532. The optical devices 510, 512, and 514 are sealed with glass sheet 600 and the metal sheet 300 that includes the casing 430, 530, and 532 so that debris produced when sawing the glass sheet 600 does not substantially compromise the optical devices 510, 512, and 514.

Figure 8:
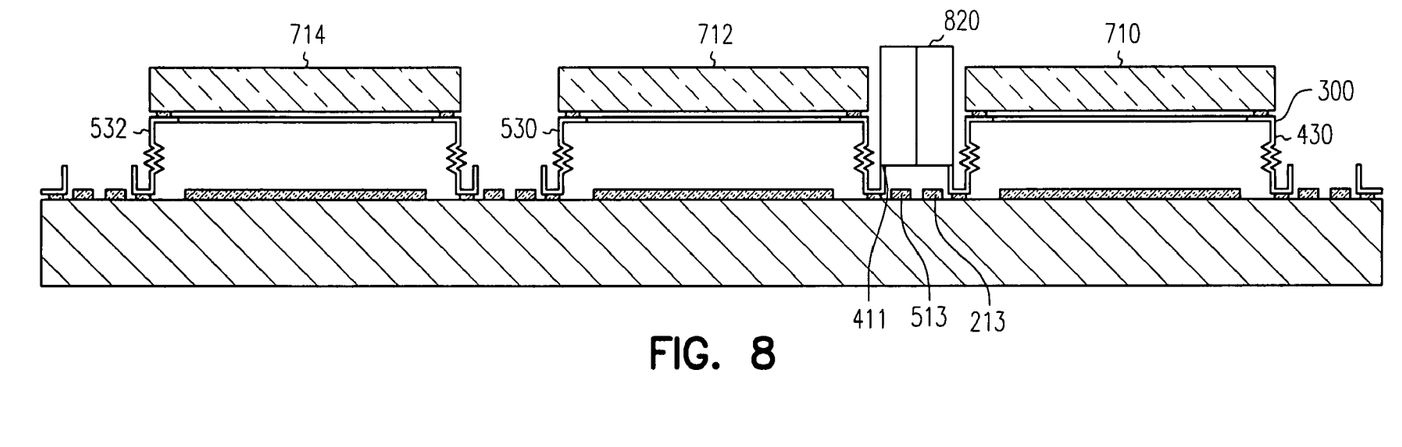
FIG. 8 illustrates a cross-sectional view of a set of glass lids attached to a plurality of casings wherein a saw removes the bridge over the electrical contacts located between at least two optical devices, according to an embodiment of this invention.

FIG. 8 illustrates a cross-sectional view of a set of glass lids 710, 712, 714 attached to individual casings 430, 530, 532 wherein the saw 820 removes the bridges, such as bridge 411, from the metal sheet 300 according to an embodiment of this invention. As shown in FIG. 8, the bridges are removed. A saw 820 is used to remove the bridges, such as bridge 411 that is located between casing 430 and the casing 530. It is contemplated that the same saw 820 could be used to remove the bridges and separate or cut the glass sheet 600 into individual lids 710, 712, 714. In another embodiment, a first saw 820 could be used to remove the bridges, such as bridge 411 and a second saw could be used to remove other bridges. In an embodiment, the bridges are shown covering contacts 513, 213. In an embodiment, the contacts can form a row that is above the periphery of the casing.

Figure 9:
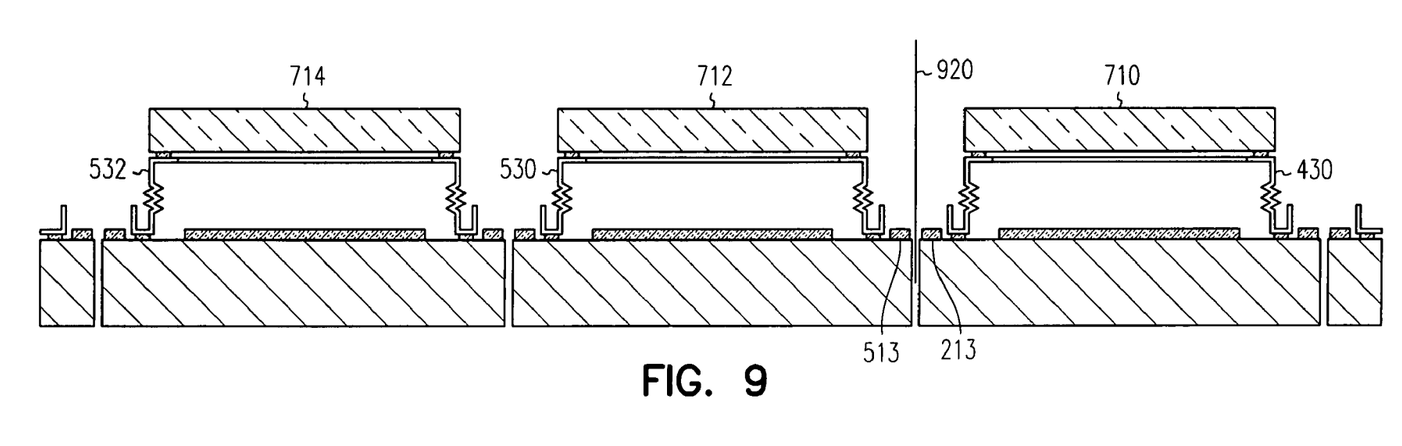
FIG. 9 illustrates a cross-sectional view of a substrate after the substrate has been diced into individual light modulators, according to an embodiment of this invention.

FIG. 9 illustrates a cross-sectional view of a substrate or wafer after the substrate or wafer has been diced into individual light modulators, according to an embodiment of this invention. After the glass sheet 600 (see FIG. 6) has been sawed into separate glass lids 710, 712, 714, and after the bridges between the casings 430, 530, 532 have been removed, a thin saw 920 can be used to cut between the electrical contacts, such as contact 513 and contact 213 that are associated with the individual light modulators. In other words, the saw 920 is used to separate the plurality of projection assemblies into individual light modulators such as the one found in FIG. 2.

Figure 10:
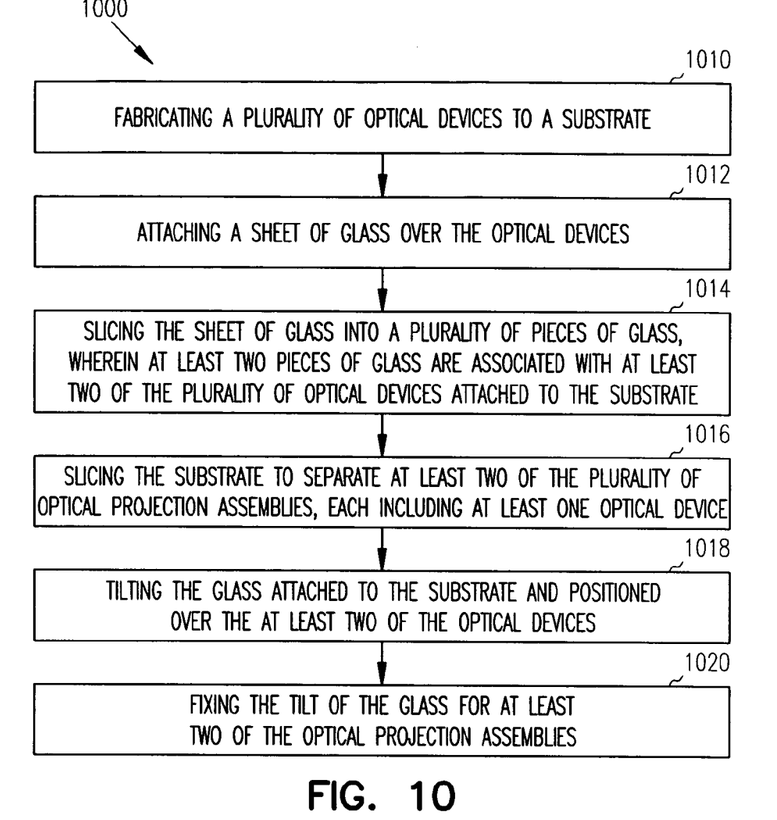
FIG. 10 is a flow diagram of a method of forming a plurality of light modulators, according to an embodiment of this invention.

FIG. 10 is a flow diagram of a method 1000 of forming a light modulator includes supporting a plurality of optical devices to a substrate 1010, and attaching a sheet of glass over the optical devices 1012 according to an embodiment of this invention. The method 1000 also includes slicing the sheet of glass into a plurality of pieces of glass 1014. At least two of the pieces of glass are associated with at least two of the plurality of optical devices supported on the substrate. The method 1000 also includes slicing the substrate to separate at least two of the plurality of light modulators, each including at least one optical device 1016, tilting the glass attached to the substrate and positioned over at least two of the optical devices 1018. The method 1000 also includes setting the tilt of the glass for at least two of the light modulators 1020.

Figure 11:
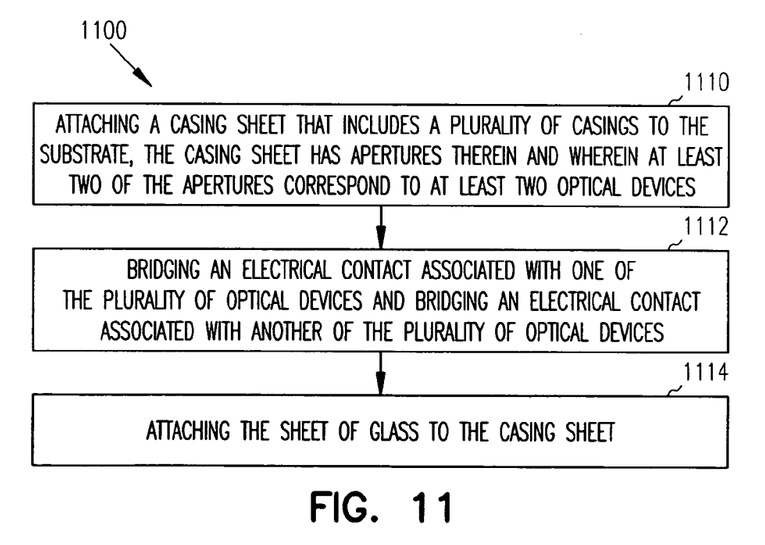
FIG. 11 is a flow diagram of a method further detailing the attachment of a sheet of glass over the optical devices, according to an embodiment of this invention.

FIG. 11 is a flow diagram of a method 1100 further detailing the attachment of a sheet of glass over the optical devices, according to an embodiment of this invention. The method 1100 includes attaching a casing sheet that includes a plurality of casings to the substrate 1110. The casing sheet has apertures therein. At least two of the apertures correspond to at least two of the optical devices. The method 1100 also includes bridging an electrical contact associated with one of the plurality of optical devices and bridging an electrical contact associated with another of the plurality of optical devices 1112. The method 1100 further includes attaching the sheet of glass to the casing sheet 1114.

It should be noted that in some embodiments it may be advisable to construct the light modulators 200 (shown in FIG. 2) on individual substrates. Therefore, it is contemplated that each of the individual light modulators could be formed on separate small substrates rather than applying the techniques shown in FIGS. 5 through 9.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, alternatives, modifications, equivalents and variations of the embodiments as fall within the spirit and broad scope of the appended claims are embraced.

What is claimed is:

1. A package comprising:
   a light modulator supported on a substrate, the light modulator including:
   an optical device supported on the substrate;
   a casing attached to the substrate, the casing surrounding the optical device, the casing further including sidewalls having adjustable tilt saw-tooth-like stress relief structures therein; and
   a glass lid attached to the casing, the glass lid, casing and substrate substantially sealing the optical device.

2. The package of claim 1 further comprising a desiccant positioned within a volume sealed by the casing, glass lid and the substrate.

3. The package of claim 1 wherein the optical device is a MEMS device.

4. The package of claim 1 wherein the light modulator is fabricated on the substrate.

5. The package of claim 1 wherein the glass lid is tilted with respect to the substrate.

6. The package of claim 1 wherein the casing includes Kovar.

7. The package of claim 1 wherein the casing includes 54Fe-29Ni-17Co.

8. A package comprising:
   a light modulator supported on a substrate, the light modulator including:
   an optical device supported on the substrate;
   a casing attached to the substrate, the casing surrounding the optical device, the casing further including sidewalls having stress relief structures therein; and
   a glass lid attached to the casing, the glass lid, casing and substrate substantially sealing the optical device, wherein the casing is comprised of a metal material having a coefficient of thermal expansion substantially equal to the coefficient of thermal expansion of silicon.

9. The package of claim 1 further comprising adhesive attached to the sidewalls of the casing.

10. The package of claim 1 further comprising a first solder material for attaching the casing to the substrate and a second solder material for attaching the casing to the glass lid.

11. A package comprising:
    a light modulator supported on a substrate, the light modulator including:
    an optical device supported on the substrate;
    a casing attached to the substrate, the casing surrounding the optical device, the casing further including sidewalls having stress relief structures therein; and
    a glass lid attached to the casing, the glass lid, casing and substrate substantially sealing the optical device;
    a first solder material for attaching the casing to the substrate and a second solder material for attaching the casing to the glass lid, wherein the first solder material for attaching the casing to the substrate has a higher melting point than the second solder material for attaching the casing to the glass lid.

12. A substrate comprising:
    a first major surface;
    a second major surface;
    a plurality of optical devices supported on the first major surface;
    a metal sheet including a plurality of connected casings, each casing including an aperture, the casing further including adjustable tilt saw-tooth-like sidewalls surrounding the apertures, the metal sheet supported on the first major surface so that the sidewalls of at least two of said plurality of casings surround at least two of the optical devices attached to the first major surface.

13. The substrate of claim 12 wherein the sidewalls surrounding the apertures include a stress relief structure.

14. The substrate of claim 12 wherein the portion of the metal sheet proximate the aperture is spaced from the substrate.

15. The substrate of claim 14 wherein the metal sheet further includes a bridge positioned between at least a first sidewall associated with a first aperture and a second sidewall associated with a second aperture, the bridge spanning at least one electrical contact on the substrate.

16. The substrate of claim 14 further comprising a sheet of glass attached to the portions of the metal sheet proximate the plurality of apertures, the glass sheet spanning at least two of the apertures in the metal sheet.

17. The substrate of claim 16 wherein the sheet of glass has a cut therein between the first sidewall associated with the first aperture and the second sidewall associated with the second aperture.

18. The substrate of claim 14 wherein the substrate further includes a slice separating a first optical device from a second optical device.

19. A substrate comprising:
    a first major surface;
    a second major surface;
    a plurality of optical devices supported on the first major surface;
    a sheet of metal including a plurality of connected casings, each casing including an aperture, the casing further including sidewalls surrounding the apertures, the sheet of metal supported on the first major surface so that the sidewalls of at least two of said plurality of casings surround at least two of the optical devices attached to the first major surface, wherein the sheet of metal is formed of a material having a coefficient of thermal expansion substantially the same as the coefficient of thermal expansion of the first major surface of the substrate.

20. The substrate of claim 12 wherein the optical devices are MEMS devices.

21. A method for forming a plurality of light modulators comprising:
    supporting a plurality of optical devices on a substrate;
    attaching a casing sheet that includes a plurality of casings to the substrate with a high melting point solder, the casing sheet having apertures therein and wherein at least two of the apertures correspond to at least two of the optical devices;
    placing a sheet of glass over the optical devices;
    attaching the sheet of class to the casing sheet with a low melting point solder;
    slicing the sheet of glass into a plurality of pieces of glass, wherein at least two of the pieces of glass are associated with at least two of the plurality of optical devices supported on the substrate.

22. The method of claim 21 further comprising slicing the substrate to separate at least two of the plurality of light modulators, each light modulator including at least one optical device.

23. The method of claim 21 further comprising tilting the glass attached to the substrate and positioned over at least two of the optical devices.

24. The method of claim 23 further comprising setting the tilt of the glass for at least two of the optical devices.

25. The method of claim 21 wherein each of the casings associated with the casing sheet includes a set of sidewalls having a stress relief feature therein, and wherein tilting the glass includes shortening or lengthening a portion of at least one of the sidewalls at the stress relief feature.

26. The method of claim 25 further comprising setting the tilt of the glass for at least two of the optical devices by placing an adhesive on at least one of the stress relief features of the sidewalls of at least two of the casings.

27. The method of claim 21 wherein attaching the casing sheet includes bridging an electrical contact associated with one of the plurality of optical devices and bridging an electrical contact associated with another of the plurality of optical devices.

28. The method of claim 27 further comprising slicing the bridge between at least two of the casings associated with the casing sheet.

29. A method for forming a plurality of light modulators comprising:
   supporting a plurality of optical devices on a substrate; and
   placing a sheet of glass over the optical devices by,
      attaching a casing sheet that includes a plurality of casings to the substrate, the casing sheet having apertures therein and wherein at least two of the apertures correspond to at least two of the optical devices; and
      attaching the sheet of glass to the casing sheet;
   slicing the sheet of class into a plurality of pieces of glass, wherein at least two of the pieces of glass are associated with at least two of the plurality of optical devices supported on the substrate;
   tilting the glass attached to the substrate and positioned over at least two of the optical devices;
   wherein attaching the casing sheet to the substrate includes soldering the attachment using a first solder and wherein attaching the glass to the casing sheet uses a second solder, wherein the first solder has a higher melting point than the second solder.

30. A light modulator comprising:
   a substrate;
   an optical device supported on the substrate; and
   means for supporting and adjustably tilting glass positioned proximate the optical device by elongating or shortening the means for supporting.

31. The light modulator of claim 30 further comprising: means for setting the tilt of the glass once the tilt is found acceptable.

32. A package comprising:
   an MEMS device supported on a substrate;
   a casing attached to the substrate, the casing surrounding the MEMS device, the casing further including sidewalls having adjustable tilt saw-tooth-like stress relief structures therein; and
   a lid attached to the casing, the lid, casing and substrate sealing the MEMs device.

33. A package, comprising:
   an MEMS device supported on a substrate;
   a casing attached to the substrate, the casing surrounding the MEMS device, the casing further including sidewalls having stress relief structures therein; and
   a lid attached to the casing, the lid, casing and substrate sealing the optical device;
   a first solder material for attaching the casing to the substrate and a second solder material for attaching the casing to the lid, wherein the first solder material for attaching the casing to the substrate has a higher melting point than the second solder material for attaching the casing to the lid.

34. An apparatus, comprising:
   a substrate having a first major surface and a second major surface;
   a plurality of MEMs devices supported on the first major surface;
   a metal sheet including a plurality of connected casings, the casing further including adjustable tilt saw-tooth-like sidewalls, the metal sheet supported on the first major surface so that the sidewalls of at least two of said plurality of casings surround at least two of the MEMs devices attached to the first major surface.

35. An apparatus, comprising:
   a substrate having a first major surface and a second major surface;
   a plurality of MEMs devices supported on the first major surface;
   a metal sheet including a plurality of connected casings, the casing further including sidewalls, the metal sheet supported on the first major surface so that the sidewalls of at least two of said plurality of casings surround at least two of the MEMs devices attached to the first major surface, wherein the metal sheet is formed of a material having a coefficient of thermal expansion substantially the same as the coefficient of thermal expansion of the substrate.

36. A method for forming a plurality of MEMS devices, comprising:
   supporting the plurality of MEMs devices on a substrate;
   attaching a casing sheet that includes a plurality of casings to the substrate with a high melting point solder, the casing sheet having apertures therein and wherein at least two of the apertures correspond to at least two of the optical devices;
   placing a sheet of material over the optical devices;
   attaching the sheet of material to the casing sheet with a low melting point solder;
   slicing the sheet of material into a plurality of pieces of material, wherein at least two of the pieces of material are associated with at least two of the plurality of MEMs devices supported on the substrate.

* * * * *